Aug. 27, 1957
C. R. GREENE
2,804,486
SELECTIVE EXTRACTION
Filed Aug. 17, 1953
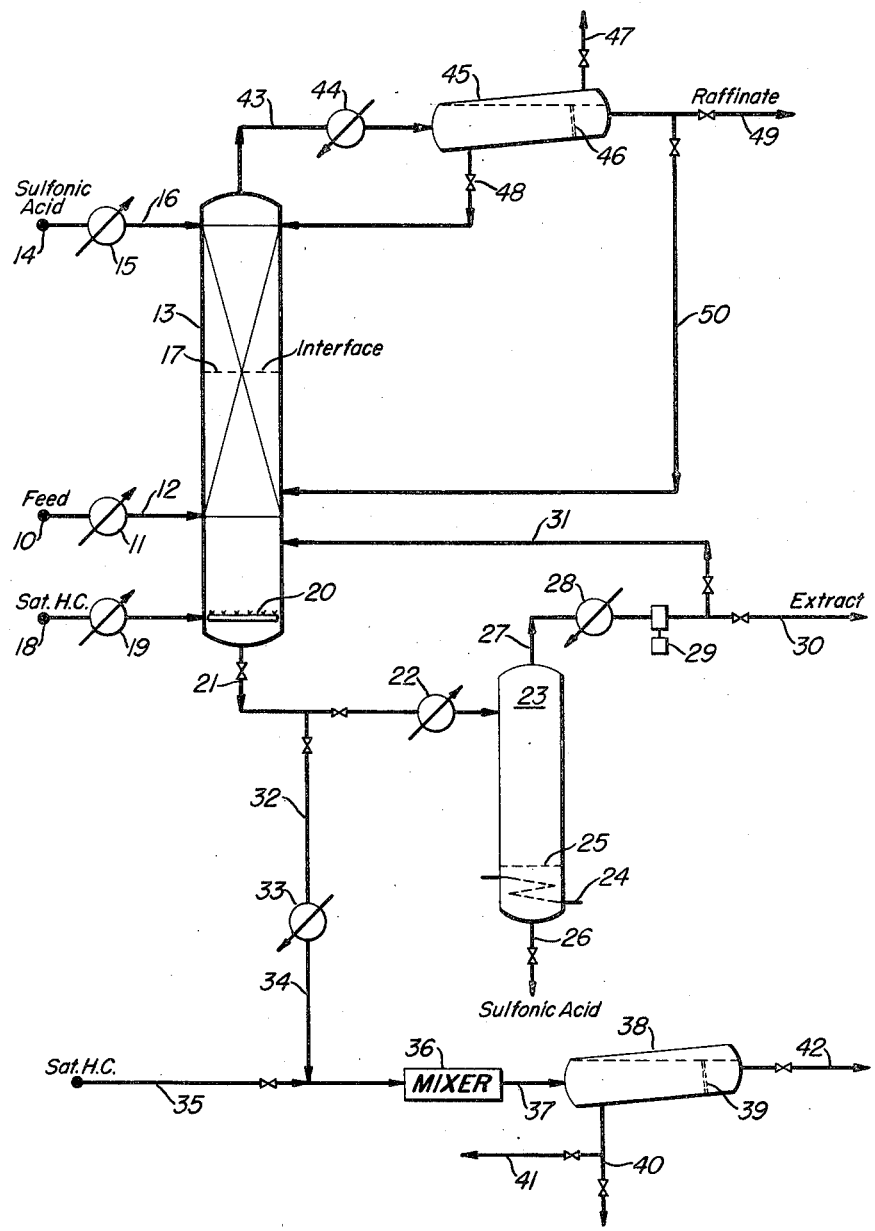
INVENTOR.
Charles R. Greene
BY
*Jam B Becker*
ATTORNEY

United States Patent Office 2,804,486
Patented Aug. 27, 1957

2,804,486

SELECTIVE EXTRACTION

Charles R. Greene, Park Forest, Ill., assignor to Standard Oil Company, Chicago, Ill., a corporation of Indiana Application August 17, 1953, Serial No. 374,723

10 Claims. (Cl. 260—674)

This invention relates to a process for the concentration of individual polyalkyl aromatic hydrocarbons from isomeric mixtures of polyalkyl aromatic hydrocarbons. More specifically, this invention relates to novel, high temperature liquid-liquid extraction processes for the concentration of vicinal polyalkylbenzenes from mixtures thereof with non-vicinal isomers. In one specific aspect, this invention is concerned with liquid-liquid extraction processes for concentrating vicinal polymethylbenzenes from close-boiling mixtures thereof with non-vicinal isomers in hydrocarbon fractions boiling below about 200° C.

One object of my invention is to provide novel liquid extractants for high temperature liquid-liquid extraction processes which are operated to concentrate individual polyalkylbenzenes from non-ideal isomeric, close-boiling mixtures of polyalkylbenzene hydrocarbons. Another object is to provide novel liquid extractants and high temperature liquid-liquid extraction processes which effect substantial concentration and separation of gasoline boiling range vicinal polymethylbenzenes from mixtures thereof with non-vicinal isomers. A specific object of this invention is to provide a liquid-liquid extraction process for the separation of o-xylene in high concentration and yield from mixtures thereof with isomeric xylenes or from a $C_8$ aromatic hydrocarbon fraction which may also contain ethylbenzene and close-boiling saturated hydrocarbons. Another specific object of my invention is to provide a liquid-liquid extraction process for separating hemimellitene from a $C_9$ aromatic hydrocarbon fraction containing isomeric polymethylbenzenes such as pseudocumene, mesitylene and, optionally, ethyltoluenes. These and other objects of my invention will become apparent from the ensuing description thereof.

By the term "vicinal polyalkylbenzene hydrocarbon" I intend to designate a hydrocarbon of the benzene series in which two or more adjacent nuclear carbon atoms are each linked to an alkyl group. It will be obvious that "vicinal polymethylbenzenes" represent a species of the broader definition just given wherein the substituent groups are methyl groups.

I have discovered the extremely surprising fact that hydrocarbon sulfonic acids, e. g., low molecular weight alkanesulfonic acids, selectively extract and concentrate vicinal polymethylbenzenes when they are applied as extractants in high temperature liquid-liquid extraction of polymethylbenzenes comprising both vicinal and non-vicinal isomers.

Briefly, the process of the present invention comprises liquid-liquid extraction of a non-ideal solution of isomeric polyalkylbenzenes, such as a mixture of xylenes produced in commercial catalytic reforming operations (hydroforming or platforming), at a high temperature of at least about 90° C. and below the temperature at which the extractant undergoes substantial thermal decomposition. The extractant is a hydrocarbon sulfonic acid or a derivative thereof having substantially unchanged solvent properties, and is employed in an amount at least sufficient to provide a system of two liquid phases, viz. a raffinate hydrocarbon phase and an extract phase which comprises essentially a solution of polyalkylbenzenes in said sulfonic acid. By the practice of the process described above, it is found that the relative concentration of vicinal polyalkylbenzene in the extracted hydrocarbons is substantially greater than in the raffinate hydrocarbons.

Ideal solutions are those in which Henry's law or Raoult's law is followed, i. e. the partial pressure of a given component above the solution is the product of the vapor pressure of the pure component and the mol fraction of the component in the solution. Conversely, non-ideal solutions are mixtures of miscible components (polyalkylbenzenes in the present case) whose behavior can not be predicted precisely by Henry's law or Raoult's law (note F. H. Getman and F. Daniels, "Outlines of Theoretical Chemistry," pp. 145–7 (1931), and O. A. Hougen and K. M. Watson, "Industrial Chemical Calculations" pp. 426–7 (1931)).

It is preferred, in the present process, to employ relatively stable hydrocarbon sulfonic acids, i. e. acids which do not suffer more than about 5 weight percent thermal decomposition within the particular temperature range required in a given extraction operation at 30 minutes. Eminently suitable for operations below about 200° C. are the low molecular weight alkanesulfonic acids having 1 to 5 carbon atoms, inclusive, in the molecule, particularly the normal-chain members of this homologous series.

Some properties of the lower alkanesulfonic acids are given in the following table:

Table 1

| Compound | B. P. °C. | mm. | M. P., °C. | Sp. Gr., 25°/4° C. |
|---|---|---|---|---|
| $CH_3SO_3H$ | 122 | 1.0 | +20 | 1.4844 |
| $CH_3CH_2SO_3H$ | 123 | 1.0 | −17 | 1.3341 |
| $CH_3CH_2CH_2SO_3H$ | 136 | 1.0 | +7.5 | 1.2516 |
| $CH_3CH(SO_3H)CH_3$ | 123 | 1.0 | | |
| $CH_3CH_2CH_2CH_2SO_3H$ | 147 | 0.5 | −15.2 | 1.1906 |

Certain properties of a commercially available mixture of certain of the lower alkanesulfonic acids, having an average molecular weight corresponding to that of ethanesulfonic acid, but containing $C_1C_4$ alkanesulfonic acids, are given in the following table:

Table 2

Composition:
    Sulfonic acids, percent _____ 94
    Water, percent _____ 5
    $H_2SO_4$, percent _____ 1
    Ash, percent _____ 0.01
Molecular weight (avg.) _____ 110
Specific gravity, (25°/4° C.) _____ 1.35

Various methods are known for the production of alkanesulfonic acids suitable for use in my invention. Thus, suitable alkanesulfonic acids may be prepared by nitrogen oxide-catalyzed air oxidation of alkyl disulfides, for example as described in U. S. P. 2,433,395. Suitable alkanesulfonic acids may also be prepared by oxidizing alkyl disulfides with nitric acid and air; by nitric acid oxidation of mercaptans; by the Reed reaction of paraffin hydrocarbons with sulfur dioxide and chlorine followed by hydrolysis; and by various other methods known in the art.

Aromatic sulfonic acids are usually prepared by sulfonation of the corresponding aromatic hydrocarbon with $SO_3$, concentrated sulfuric acid or with chlorosulfonic acid. Suitable aromatic sulfonic acids include benzenesulfonic acid, chlorobenzenesulfonic acid, toluenesulfonic acids, xylenesulfonic acids, and the like.

It should be understood that various hydrocarbon sulfonic acids may be employed as extractants in the present process regardless of the method of manufacture. In "low-temperature fluid" catalytic cracking, and (5) "high-temperature fluid" catalytic cracking. The data indicate that the relative amounts by volume of the four $C_8$ alkylbenzenes are not greatly different in the five different products, being, on the average, as follows: ethylbenzene, 12; ortho-xylene, 21; meta-xylene, 48; para-xylene, 19%. These amounts correspond substantially to those expected from chemical thermodynamic equilibrium calculations for the operating temperatures involved. The naphthenic plus paraffinic hydrocarbon content of the samples varied from about 7 to about 45 percent by volume. ("Alkylbenzenes in the $C_8$ Fraction From Five Different Catalytic Petroleum Refining Processes," J. Res. Nat. Bur. Standards 39 (Oct. 1947), pp. 303–308.)

A typical $C_8$ aromatic hydroformate has the following composition:

*Table 3* miscible with the charging stock and substantially insoluble in the sulfonic acid extractant under the conditions of extraction. Particularly suitable auxiliary solvents are normally liquid saturated hydrocarbons, particularly praffin hydrocarbons such as n-pentane, isopentane, n-hexane, n-heptane, n-octane, n-dodecane, cetane, petroleum ether, a sulfuric acid-treated white mineral oil, etc. Various cycloparaffins may also be employed as auxiliary solvents, e. g. cyclohexane, cyclopentane, methylcyclopentane, methylcyclohexane, decahydronaphthalene, etc. In order to minimize the pressure in the liquid-liquid extraction equipment, it is desirable to employ a solvent having a relatively low vapor pressure under the conditions of extraction and one which boils outside the boiling range of the hydrocarbon charging stock in order to facilitate the subsequent separation of the auxiliary solvent from both raffinate and extract phases by fractional distillation.

The proportion of auxiliary solvent which is employed in the present process may be varied between about 40 and about 200 volume percent, based on charge, but is ordinarily employed in proportions between about 50 and 150 volume percent, based on charge. Excellent separations have been obtained by the use of 1 volume of heptane per volume of charge, as shown in the following tabulation of runs. The auxiliary solvent may be introduced with the charging stock, but is preferably introduced into and intimately contacted with the extract phase in order to effect efficient stripping thereof, which results in greatly enhanced selectivity of extraction, as will be shown hereinafter.

In the process of the present invention, a fraction comprising polyalkylbenzenes of similar volatility, boiling over a range of about 2 to 20° C., including at least one vicinal polyalkylbenzene, is subjected to liquid-liquid extraction with a stable hydrocarbon sulfonic acid in a suitable contacting device, e. g. a fractionating tower containing packing materials, fractionating trays, perforated plates, or the like, or a centrifugal contacting device. Batch extraction equipment can be used. The feed and solvent may be mechanically agitated and then allowed to settle. The above, and other suitable contacting means are well known in the art. A liquid raffinate or acid-insoluble hydrocarbon phase is removed from the contacting zone; this phase is characterized by a substantially reduced proportion of one or more of the vicinal polyalkylbenzenes, as compared with their proportion in the feed stock. The enriched liquid extractant, or extract phase, which is removed from the contacting device contains polyalkylbenzenes which are substantially enriched with one or more vicinal polyalkylbenzenes, relative to the concentration of those alkylbenzenes in the feed stock.

The proportion of hydrocarbon sulfonic acid which is employed in the present process may range from about 10 to about 500 volumes (liquid) per 100 volumes of hydrocarbon charging stock and is usually selected within the range of about 25 to 100 volumes or about 50 volumes of acid per 100 volumes of hydrocarbon charging stock. In any case, the sulfonic acid must be employed in a proportion sufficient to form a distinct liquid phase under the extraction conditions.

The liquid-liquid extraction process can be practiced at temperatures within the range of about 70° to about 180° C. I prefer to employ temperatures between about 90° C. and about 130° C. The specific pressures selected will depend upon the boiling range of the hydrocarbon feed stock, but will in all caess be such as to maintain a substantial proportion of the hydrocarbon charging stock and the sulfonic acid in the liquid phase. The pressures in the extraction zone may range from about atmospheric to about 500 pounds per square inch. Ordinarily, the extraction operation is conducted, for reasons of convenience and economy, at a pressure which is just sufficient to maintain the liquid phase, i. e. to maintain liquid-liquid extraction conditions.

In the extraction of hydrocarbon mixtures comprising predominantly or exclusively $C_8$ aromatic hydrocarbons containing orthoxylene, at least one other xylene and, optionally, ethylbenzene, temperatures are usually selected within the range of about 100 to about 150° C. at pressures sufficient to maintain the liquid phases, preferably employing a $C_1$—$C_5$ n-alkanesulfonic acid in proportions between about 25 and about 50 volumes per 100 volumes of aromatic hydrocarbon charging stock.

The following specific examples are supplied in order more fully to illustrate my invention, it being understood, however, that the examples are not intended to delimit the invention.

A series of runs was made, employing a batch extraction procedure. Contacting of a $C_8$ hydroformate fraction was effected in a 1-liter fluted glass flask, provided with a bottom stopcock for the withdrawal of extract phase and a mechanical stirrer to effect vigorous contacting of sulfonic acid and the mixture of hydrocarbons. In order to insure adequate contacting, a stirring period of 30 minutes was employed although evidence indicates that a much shorter contact time could have been employed without substantially affecting the results. The ratio of sulfonic acid to hydrocarbon mixture was 1:2. The sulfonic acids employed were a commercial mixture of $C_1$—$C_4$ alkanesulfonic acids produced by the Indoil Chemical Company, having essentially the characteristics shown in Table 2 above; the mixed sulfonic acids were distilled before use to produce a substantially anhydrous material. The charging stock was a $C_8$ hydroformate having the following percentage composition as determined by ultraviolet spectrographic analysis:

*Table 6*

|  | Volume percent |
|---|---|
| Ethylbenzene | 25.2 |
| p-Xylene | 13.4 |
| m-Xylene | 35.9 |
| o-Xylene | 17.8 |
| Saturates and $C_9$ aromatics | 7.7 |

The volume of charging stock employed in each instance was 100 cc. The analytical values in the following tabulation under "Extract" and "Raffinate" are values in cubic centimeters.

In the test runs, following the contacting of sulfonic acids and charging stock at the temperatures shown in the following tabulation, the mechanical stirrer was stopped, whereupon rapid settling of raffinate and extract phases occurred. The extract phase was colored, the color varying from yellowish to dark brown, and the interface between the phases was clearly discernible. The extract layer was withdrawn through the bottom stopcock of the contactor and extracted hydrocarbons were separated from the sulfonic acid by steam distillation. The raffinate phase was removed from the contactor, neutralized with alkali, washed with water, dried over calcium chloride, distilled and subjected to ultraviolet analysis.

In the following tabulation, the alpha factors which are shown are the conventional separation or enrichment factors and are computed by dividing the volume ratio of ortho-xylene to meta-, para-xylene or ethylbenzene in the extract phase divided by the corresponding ratio in the raffinate phase, analogous to the derivation of alpha factors in distillation (note Colburn et al., Trans. Am. Inst. Chem. Engrs. 41, 421–443 and 645 (1945)). An alpha factor of 1 denotes no selectivity, i. e. that no separation has occurred in the process. The number of theoretical stages required for substantially complete separation at practical reflux ratios can be approximated through the use of the equations: $N_p = 18.4/\alpha - 1$. It will be apparent from the high alpha factors obtained in the various runs, especially when an auxiliary solvent was employed, that the present process represents a practical and important means of concentrating vicinal polyalkylbenzenes in the extract phase.

Table 7

| Run | Acid | Temp., °C. | Auxiliary Solvent (v./v. charge) | Extract, cc. | | | | Raffinate, cc. | | | | Alpha Factors | | | Vol. Percent of Ortho-Xylene Extracted |
|---|---|---|---|---|---|---|---|---|---|---|---|---|---|---|---|
| | | | | Ethyl-benzene | p-Xy-lene | m-Xy-lene | o-Xy-lene | Ethyl-benzene | p-Xy-lene | m-Xy-lene | o-Xy-lene | Ortho: Meta | Ortho: Para | Ortho: Ethyl-benzene | |
| 1 | Mixed Alkane-sulfonic. | 60 | None | 5.0 | 2.6 | 7.2 | 3.6 | 18.7 | 10.0 | 26.0 | 13.2 | 1.0 | 1.05 | 1.28 | |
| 2 | ...do... | 80 | ...do... | 8.9 | 5.9 | 14.1 | 8.7 | 13.5 | 7.7 | 18.2 | 8.7 | 1.3 | 1.3 | 1.5 | |
| 3 | ...do... | 100 | ...do... | 5.3 | 3.4 | 6.6 | 6.3 | 21.3 | 12.3 | 31.2 | 15.5 | 1.9 | 1.44 | 1.63 | 28.9 |
| 4 | ...do... | 120 | ...do... | 2.5 | 2.4 | 5.5 | 7.0 | 23.0 | 12.3 | 30.1 | 12.0 | 3.2 | 3.0 | 5.4 | 36.8 |
| 5 | ...do... | 130 | ...do... | 3.5 | 3.25 | 9.34 | 11.8 | 25.7 | 12.5 | 27.9 | 6.5 | 5.5 | 7.0 | 13.4 | 64.5 |
| 6 | ...do... | 140 | ...do... | 1.7 | 3.15 | 8.4 | 10.5 | 24.0 | 11.0 | 25.4 | 4.4 | 7.2 | 8.4 | 33.7 | 70.4 |
| 7 | ...do... | 100 | Heptane, 1. | | 0.8 | 3.1 | 12.5 | 26.9 | 14.9 | 34.7 | 9.3 | 15 | 25 | Infinite | 57.4 |
| 8 | Benzenesulfonic. | 100 | None | 3.1 | 2.2 | 5.7 | 3.6 | 19.2 | 12.7 | 32.3 | 18.4 | 1.1 | 1.1 | 1.7 | 16.3 |
| 9 | Toluenesulfonic. | 100 | ...do... | 4.0 | 3.1 | 7.0 | 5.9 | 23.1 | 12.1 | 29.2 | 12.7 | 2 | 1.8 | 2.7 | 31.7 |
| 10 | ...do... | 140 | ...do... | 2.6 | 2.2 | 5.2 | 6.1 | 24.8 | 12.6 | 29.0 | 12.5 | 2.7 | 2.8 | 4.7 | 32.8 |
| 11 | ...do... | 100 | Heptane, 1. | 3.0 | 4.2 | 13.2 | 12.9 | 22.4 | 10.1 | 22.6 | 2.5 | 8.8 | 12.4 | 38.8 | 83.75 |
| 12 | Xylenesulfonic. | 100 | None | 3.0 | 2.9 | 6.1 | 6.1 | 21.4 | 13.7 | 31.2 | 16.0 | 1.97 | 1.81 | 2.71 | 27.6 |

Runs 1 to 6 illustrate the effect of increasing temperature on the selectivity of separation of the charging stock with mixed $C_1$—$C_4$ alkanesulfonic acids over the range of 60° C. to 140° C. under otherwise constant operating conditions. The remarkable increase in alpha values in going from the lower to the higher temperatures will be apparent from the tabulated data. In run 1, at 60° C., there was essentially no increase in o-xylene concentration in the extract, as compared with feed, whereas in run 2, at 80° C., substantially increased concentration of o-xylene in the extract was found. Also interesting is the fact that the extent of ortho-xylene extraction increased sharply with temperature, since ordinarily, selectivity of extraction and the absolute degree of extraction are usually inversely related.

Run 7 illustrates the phenomenal effect of the auxiliary solvent on selectivity; it will be noted also that the percentage of ortho-xylene which was extracted was increased from 28.9% in run 3 to 57.4% in run 7, in which the auxiliary solvent was employed.

In run 8 benzenesulfonic acid was employed as the extractant. In general, its selectivity appeared to be somewhat less than that of the mixed alkanesulfonic acids at 100° C., although better results would be expected at higher temperatures. The data obtained in run 9 from the use of commercial toluenesulfonic acid (dehydrated by distillation before use) showed it to be comparable as an extractant with the low molecular weight alkanesulfonic acids. In run 10 the employment of a higher temperature with toluenesulfonic acid improved the results and in run 11, even at 100° C., it was found that the use of the auxiliary solvent very greatly increased the selectivity of the extraction and that the percentage of ortho-xylene extracted was more than double the amount obtained in run 9 (same temperature, no auxiliary solvent).

Run 12 was made with 40 g. commercial xylenesulfonic acids and 100 cc. of the same xylenes feed employed in the other runs. The stirring period was 15 minutes. It will be noted that the separation factors were about the same as those obtained with toluenesulfonic acid (run 9).

A commercial embodiment of the invention is depicted in the accompanying figure. Specifically illustrated is the use of a lower molecular weight alkanesulfonic acid or mixture of alkanesulfonic acids and a xylenes charging stock containing about 10 to about 30 volume percent of ortho-xylene and at least one isomer thereof.

Before being used as a charging stock in the present liquid-liquid extraction process, the feed stock is preferably separated from any sulfur-containing impurities or olefins by known methods. It may be desirable, although not in all cases essential, to treat the hydrocarbon charging stock with concentrated sulfuric acid in proportions between about 5 and about 10 lbs./barrel at temperatures between about 20° and about 50° C., followed by a water wash, if desired. It is desirable to employ substantially dry hydrocarbon charging stocks, i. e., stocks containing not more than about 3–5 wt. percent water.

As shown in the accompanying figure, the feed stock is passed through line 10 into a heat exchanger 11 wherein its temperature is adjusted to a suitable value, for example between about 90° C. and about 130° C., thence through line 12 into a countercurrent extraction column 13 at an intermediate point therein. The extraction column is provided with suitable liquid-liquid contacting devices such as bubble trays, perforated plates, commercial packing or contacting surfaces, such as glass spheres, jack chain, glass helices, shaped wire netting, Berl saddles, Raschig rings, Scofield packing, Stedman packing, McMahon packing or the like, as illustrated schematically in the accompanying figure.

Any suitable means of thoroughly contacting the sulfonic acid and hydrocarbon feed may be employed, e. g. agitation of the materials or the imposition of pulsations on the liquids in the extraction column (note George Feick and H. M. Anderson, Ind. Eng. Chem. 44, 404–9 (Feb. 1952)).

The internal surfaces of tower 13 should be made of or clad with materials resistant to the action of the sulfonic acid being used as liquid extractant. Thus, the tower may contain a glass lining, or the internal surfaces may be of various types of acid-resistant stainless steel such as types 304, 316, 347, Worthite, Stellite No. 6, etc. Tower 13 may be provided with suitable lagging to avoid the loss of heat therefrom and the liquid-liquid contacting section may be provided with temperature control means such as a heating jacket to maintain suitable temperatures therein. A very small proportion of ortho-phosphoric acid may be added to the sulfonic acid extractant as a corrosion inhibitor.

The extractant liquid sulfonic acid, exemplified by a commercial mixture of $C_1$—$C_4$ normal-chain alkanesulfonic acids, is introduced into the upper portion of tower 13 through line 14 and heat exchanger 15, wherein the temperature of the stream is suitably regulated, in proportions between about 25 and about 75 liquid volumes per 100 liquid volumes of feed introduced into the system via line 10. The liquid sulfonic acid stream passes downwardly through the tower and is substantially enriched in hydrocarbon content, the enrichment being selective in respect of ortho-xylene.

The enriched sulfonic acid accumulates in the lower zone of tower 13 as a pool of liquid having the liquid-liquid interface 17. The liquid level 17 may be maintained by conventional control instruments. It is preferred to operate tower 13 rich in extract with a high interface level, although the reverse operational technique may also be employed. Fractionation of the aromatic hydrocarbon content of the enriched extractant in the lowermost portion of tower 13 can be achieved by introducing substantially pure o-xylene or an o-xylene concentrate through line 31.

An auxiliary solvent, e. g. a paraffinic hydrocarbon which can be separated from the products by fractional distillation, is introduced through line 18 and heat exchanger 19 through a spider 20 into the extract phase in tower 13, in proportions between about 40 and about 200 volumes per 100 volumes of charging stock introduced through line 10.

The enriched and fractionated extractant is withdrawn from tower 13 through valved line 21 and heater 22 into equipment adapted to separate hydrocarbons and sulfonic acids, respectively, from the extract phase. Suitable equipment comprises a stripper 23, provided with a reboiler coil 24. The enriched extractant is introduced into tower 23 at a suitable temperature for stripping, which temperature will vary somewhat in accordance with the absolute pressure maintained in tower 23 and with other operational features which will be described hereinafter, but will usually be between about 60 and 140° C. at pressures between about 10 mm. of mercury and ordinary atmospheric pressure.

If desired, inert stripping gases, such as low boiling paraffin hydrocarbons or steam, may be introduced into the pool of liquid which accumulates in the lower portion of stripper 23. The upper portion of tower 23 may be provided with suitable vapor-liquid contacting devices to increase the efficiency of stripping. In its flow downwardly through tower 23, the enriched sulfonic acid extractant is substantially denuded of its content of extracted xylenes which pass overhead as vapor. The denuded extractant accumulates as a pool having the vapor-liquid interface 25 in tower 23 in the lower portion thereof. The vapor-liquid interface may be maintained by the use of conventional liquid level control devices. The denuded extractant is removed from tower 23 through valved line 26, whence all or part thereof can be recycled (by lines not shown) for re-use in tower 13. Usually an aliquot of the denuded extractant is removed from the system through valved line 26 and is replaced by an equal amount of fresh sulfonic acid entering the system through line 14. The sulfonic acid removed through line 26 may be subjected to special purification, concentration or fortification procedures to prepare it for re-use in the extraction system.

The stripping temperature in tower 23 may be minimized by the use of low pressures, thereby minimizing the possibilities of sulfonic acid decomposition, of hydrocarbon reactions and also reducing the size of tower 23. Suitable low pressures which can be readily attained on a commercial scale are about 10–75 mm. of mercury, in which case suitable stripping temperatures to remove o-xylene from the enriched extractant will lie between about 50 and about 120° C. However, the pressure in tower 23 may be atmospheric, and even slightly super-atmospheric, due to the accumulation of the evolved vapors therein.

The ortho-xylene concentrate passes overhead of tower 23 through line 27 and condenser 28 whence it is pumped through valved line 30. An aliquot of the o-xylene concentrate may be diverted through valved line 31 for passage into the lower portion of tower 13 to serve as reflux to aid in stripping the enriched liquid extractant in the lower portion of tower 13.

Steam stripping of the enriched extractant may be practiced in tower 23, but is usually not as desirable as stripping with dry gas, since condensation of steam dilutes the sulfonic acid and necessitates fortification with fresh concentrated acid or concentration of the diluted acid. When steam stripping is practiced in tower 23, it is necessary to dry the stripped aromatic hydrocarbons prior to their recycle as reflux through line 31, as described above.

The o-xylene concentrate vapors passing through line 30 may be treated with water or aqueous alkali in order to remove occluded sulfonic acid.

The pool of extract in the lowermost portion of tower 13 may be maintained at a somewhat higher temperature than the remainder of the tower contents by the employment of a heating coil or jacket or by introducing preheated auxiliary solvent at a suitable temperature.

The liquid o-xylene concentrate may, if desired, be subjected to further purification or concentration proceedings, for example, redistillation to separate an o-xylene concentrate from auxiliary solvent, treating with active adsorbents such as acid-treated clays or the like, redistillation, etc. If desired, an aliquot of the liquid o-xylene concentrate may be charged with the feed entering the extraction system via line 10.

One mode of operation which is an alternative to the stripping operation effected in tower 23 involves diverting the extract phase flowing through valved line 21 through valved line 32 into heat exchanger 33, wherein its temperature may suitably be adjusted to a desired value, thence through line 34 into valved line 35. A paraffinic hydrocarbon solvent is introduced into valved line 35 and the stream passes into a mixer 36, which may be of conventional design, for example an orifice mixer, a vessel provided with a powered mechanical agitator, etc., whence the mixture passes through line 37 into a settler 38 provided with a weir 39. The paraffinic hydrocarbon solvent which is employed is preferably a normally liquid material which differs substantially in boiling point (or range) from the boiling range of the extract hydrocarbons. The paraffinic hydrocarbon solvent is employed in proportion sufficient to effect substantial extraction of the aromatic hydrocarbons from the acid extract phase, e. g. about 15 to about 50 mols per mol of aromatic hydrocarbon in the extract phase. Suitable paraffinic hydrocarbons include n-pentane, n-hexane, n-heptane, 2,2,4-trimethylpentane, white oils, etc. An effective solvent is n-heptane, which at 25° C. removes about 1 mol of xylenes from mixed ($C_1$—$C_4$) alkane-sulfonic acids in about 25 mols of n-heptane.

In settler 38, a lower, predominantly acid phase, substantially denuded of $C_8$ aromatic hydrocarbons is formed and is withdrawn from the system, wholly or in part, through valved line 40 or recycled via valved line 41 (and lines not shown) to extraction tower 13. A solution of extracted $C_8$ aromatic hydrocarbons passes over weir 39 in settler 38, to be withdrawn through valved line 42, thence to distillation apparatus (not shown) to effect separation of the paraffinic hydrocarbon solvent from said $C_8$ aromatic hydrocarbons.

Unabsorbed $C_8$ aromatic hydrocarbons (raffinate) characterized by a substantially reduced o-xylene content, pass into the upper portion of extraction tower 13, thence through line 43 and cooler 44 in which they are cooled to a temperature between about 10° C. and about 50° C., preferably about 20° C. The raffinate then passes into settler 45 provided with weir 46 and valved gas vent 47. Any sulfonic acid which may be carried overhead from tower 13 accumulates in the section of settler 45 below the weir, whence it is removed through valved line 48 and reintroduced into the upper portion of tower 13. The $C_8$ aromatic hydrocarbon fraction which collects in the upper portion of settler 45 is withdrawn therefrom through line 49. The raffinate may be washed with water or alkali to remove traces of occluded sulfonic acid and the raffinate may then be fractionally distilled to separate it from auxiliary solvent, which may be recycled to tower 13. A portion of the raffinate may be recycled to tower 13 through valved line 50.

It will be appreciated that the embodiment shown in the accompanying figure is purely illustrative and not limitative of the present invention. Thus, instead of stripping hydrocarbons from the enriched extractant, other methods of separation may be employed. For example, the enriched extractant withdrawn from tower 13 through line 21 may be diluted with water in an amount sufficient to effect substantial rejection of the aromatic hydrocarbons from the diluted sulfonic acid extractant to produce a distinct upper layer which may be separated from the aqueous acid layer by centrifuging or settling.

In batch operations, the first portion of the stripped hydrocarbon vapors passing overhead from tower 23 may be segregated from the principal portion, thus further concentrating the o-xylene in the principal fraction.

In small scale operations in which it is not desired to recover and recycle the sulfonic acid extractant, the enriched extractant can be separated from the solute aromatic hydrocarbons by effecting neutralization of the sulfonic acid with aqueous alkalies, which, as in the dilution technique above described, results in the rejection of the solute hydrocarbons from the acid into an upper hydrocarbon phase which can be treated as above described.

The present process may be used in combination with other processes to effect substantial resolution of mixtures of $C_8$ aromatic hydrocarbons, e. g. the four $C_8$ aromatic isomers derived from catalytic aromatization or reforming processes. The present process can be used with substantial advantage in combination with processes for p-xylene separation by crystallization at low temperatures and/or in combination with liquid HF—$BF_3$ selective extraction processes for the selective separation of m-xylene, for example as described in A. P. Lien et al. U. S. P. 2,528,892 (patented November 7, 1950), or in the publication entitled, "Hydrogen Fluoride-Boron Trifluoride Extraction of Xylene Isomers" by D. A. McCaulay et al., Ind. Eng. Chem. 42, 2103–7 (Oct. 1950). A brief review of para-xylene crystallization techniques is given by Love and Pfennig (infra) and in Chemical Engineering 59, 219 (April 1952).

A number of combination processes involving the process of the present invention are set forth hereinafter for purposes of illustration.

(1) p-Xylene or p-xylene together with some m-xylene are removed from the $C_8$ aromatic fraction by low temperature crystallization. The mother liquor, containing ethylbenzene, ortho-xylene and a reduced proportion of p-xylene, is treated by the present process to produce a concentrate of o-xylene. The raffinate product from the present process, comprising essentially m-xylene and ethylbenzene, can readily be separated by HF—$BF_3$ extraction, particularly in a process operated at low temperatures between about $-50°$ C. and about $-10°$ C. with molar ratios of $BF_3$:m-xylene not in excess of 1 in any given HF—$BF_3$ extraction stage.

(2) m-Xylene can be recovered from the $C_8$ aromatic fraction by HF—$BF_3$ treatment as described in the above-mentioned publications, optionally at low temperatures between about $-25°$ C. and about $-50°$ C. in order to avoid ethylbenzene disproportionation. The raffinate from the HF—$BF_3$ extraction process comprising essentially o-xylene, p-xylene, ethylbenzene and a reduced proportion of m-xylene, can be treated by the present process to separate o-xylene and to produce a second raffinate consisting largely of p-xylene-ethylbenzene which can readily be separated by low temperature fractional crystallization.

(3) The $C_8$ aromatic fraction is subjected to the present process to produce an o-xylene concentrate. The unabsorbed $C_8$ product from the present process is treated to effect crystallization of para-xylene at low temperatures and the mother liquor from the crystallization process is then subjected to selective extraction with liquid HF and $BF_3$, preferably at low temperatures within the range of $-50°$ C. to about $-10°$ C. employing not more than 1 mol of $BF_3$ per mol of meta-xylene to effect selective extraction of meta-xylene from ethylbenzene, while avoiding ethylbenzene disproportionation. However, in the HF—$BF_3$ treatment higher temperatures and higher $BF_3$ ratios may deliberately be employed in order to effect substantial conversion of the m-xylene-ethylbenzene charging stock to sym-dimethylethylbenzene.

(4) The $C_8$ aromatic hydrocarbon fraction can be subjected to the present process and the unextracted aromatic hydrocarbons can then be subjected to liquid HF—$BF_3$ extraction, preferably at low temperatures in the range of about $-10°$ C. to $-50°$ C. with not more than 1 mol of $BF_3$ per mol of meta-xylene to effect selective separation of m-xylene. The raffinate from the HF—$BF_3$ extraction process can then be subjected to low temperature crystallization operations to effect the separation of p-xylene therefrom and the production of a mother liquor which is a concentrate of ethylbenzene.

(5) A m-xylene concentrate, for example the concentrate which can be produced by selective extraction of m-xylene from its isomers by the employment of liquid HF—$BF_3$, is subjected to catalytic isomerization to convert part of the m-xylene to o-xylene (and usually some p-xylene, as well) and the isomate can be treated by the present process to produce o-xylene in high concentration. The raffinate from the present process can then be treated at low temperature to effect selective crystallization of p-xylene and the m-xylene concentrate, which constitutes the mother liquor from p-xylene filtration, can be recycled to the catalytic isomerization process. Alternatively, the $C_8$ aromatics which escape extraction in the present process can be subjected to low temperature treatment with liquid HF—$BF_3$ to remove m-xylene, which is recycled to the catalytic isomerization operation, and the p-xylene-ethylbenzene raffinate can be treated to effect selective crystallization of p-xylene. In still another mode of operation, the raffinate from the sulfonic acid extraction step can be recycled directly to the catalytic m-xylene isomerization reactor.

In addition to the $C_8$ and $C_9$ aromatic hydrocarbon charging stocks described above, the charging stocks to the present process may be isomeric cymenes mixtures including the vicinal isomer or diethyl-benzenes including the vicinal isomer. The present process may, likewise, be applied to non-ideal mixtures of two or more chlorotoluenes, dichlorobenzenes or trichlorobenzenes, including the vicinal isomer.

The o-xylene concentrate produced by the present process is of substantial commercial importance as a charging stock for catalytic oxidation to o-toluic acid and phthalic anhydride. It is also susceptible of many other chemical conversions which are of commercial interest.

The raffinate product is a very desirable charging stock for the production of styrene by catalytic dehydrogenation, employing the known catalysts and operating techniques which have heretofore been employed with pure ethylbenzene charging stocks or ethylbenzene-xylenes charging stocks. Thus, the raffinate from my process may be heated and passed into contact with a dehydrogenation catalyst such as platinum supported upon alumina, palladium supported upon silica gel, magnesium chromite catalysts, etc. The catalyst may be employed either as a fixed bed or in the fluidized condition, the latter being preferred because of the ease with which the catalyst may be withdrawn from the dehydrogenation zone and regenerated in a separate zone. The effluent from the catalytic dehydrogenation process may be subjected to the known techniques for the separation of styrene from xylenes, for example, fractional distillation, steam distillation, extractive distillation with polar solvents or absorption in acidic media or upon solid acidic surfaces. Following the separation of styrene from the dehydrogenation process effluent, the mixture of meta- and para-xylenes may then be used as desired. Thus, the p-xylene can be separated from m-xylene by low temperature crystallization or the m-xylene can be selectively extracted with liquid HF—$BF_3$.

The employment of low molecular weight alkanesulfonic acids for liquid-liquid extraction of cracked or straight run distillates such as gasoline, naphthas and higher boiling oils at temperatures below 40° C., particularly below 5° C., in order to effect selective extraction of sulfur compounds therefrom while avoiding the extraction of substantial proportions of aromatic hydrocarbons, is described in U. S. P. 2,204,903 of D. S. McKittrick (patented June 18, 1940).

British Patent 613,770 of Universal Oil Products Co. (accepted December 2, 1948), describes liquid-liquid extraction of aromatic hydrocarbons from mixtures thereof with non-aromatic hydrocarbons by the use of sulfuric acid containing therein certain silver compounds. Silver is shown to induce partial sulfonation of aromatic hydrocarbons such as benzene by the strong sulfuric acid reagent. An optional addition of aromatic sulfonic acid to the $H_2SO_4$-silver salt extractant is described. Separation of one aromatic hydrocarbon isomer from another is not described in the British patent. It should be noted that the process does not require the use of sulfuric acid in the extractant, and requires no silver salt or other metal salts whatsoever.

Having thus described my invention, what I claim is:

1. The process which comprises subjecting a mixture of isomeric $C_8$ aromatic hydrocarbons including ortho-xylene to liquid-liquid extraction with a solvent consisting essentially of a hydrocarbon sulfonic acid containing not more than 5 percent by weight of water in proportion sufficient to form a distinct liquid phase at a temperature above about 70° C. and below a temperature at which substantial thermal decomposition of said sulfonic acid occurs, said hydrocarbon sulfonic acid being selected from the class consisting of alkanesulfonic acids containing 1 to 5 carbon atoms, inclusive, in the molecule and sulfonic acids of benzene and methylbenzenes, separating raffinate and extract phases from the extraction operation, and recovering from the extract phase a concentrate of ortho-xylene in which said ortho-xylene is present in substantially greater concentration than its concentration in said charging stock.

2. The process of claim 1 in which said extraction is effected at a temperature between about 70° C. and about 180° C.

3. The process of claim 1 wherein said hydrocarbon sulfonic acid is an alkanesulfonic acid containing 1 to 5 carbon atoms, inclusive, in the molecule.

4. The process of claim 1 wherein said hydrocarbon sulfonic acid is an alkanesulfonic acid containing 1 to 5 carbon atoms, inclusive, in the molecule and wherein said extraction is effected at a temperature between about 90° C. and about 130° C.

5. The process of claim 1 wherein said sulfonic acid is benzenesulfonic acid.

6. The process of claim 1 wherein said sulfonic acid is a toluenesulfonic acid.

7. The process of claim 1 wherein said sulfonic acid is a xylenesulfonic acid.

8. The process which comprises subjecting a mixture of isomeric polymethylbenzenes including a vicinal polymethylbenzene having 8 to 9 carbon atoms, inclusive, per molecule to a liquid-liquid extraction with a solvent consisting essentially of a hydrocarbon sulfonic acid containing not more than 5 percent by weight of water in proportion sufficient to form a distinct liquid phase at an extraction temperature above about 70° C. and below a temperature at which substantial thermal decomposition of said sulfonic acid occurs, said hydrocarbon sulfonic acid being selected from the class consisting of alkanesulfonic acids containing 1 to 5 carbon atoms, inclusive, in the molecule and sulfonic acids of benzene and methylbenzenes, separating raffinate and extract phases from the extraction operation, and recovering from the extract phase a concentrate of said vicinal polymethylbenzene in which said polymethylbenzene is present in substantially greater concentration than its concentration in said charging stock.

9. The process of claim 8 wherein said solvent consists essentially of an alkanesulfonic acid containing 1 to 5 carbon atoms, inclusive, in the molecule.

10. The process of claim 8 wherein said solvent consists essentially of a mixture of alkanesulfonic acids containing 1 to 4 carbon atoms, inclusive, in the molecule.

References Cited in the file of this patent
UNITED STATES PATENTS

| | | |
|---|---|---|
| 2,357,344 | Morris et al. | Sept. 5, 1944 |
| 2,403,972 | Friedman | July 16, 1946 |
| 2,567,228 | Morrell et al. | Sept. 11, 1951 |

OTHER REFERENCES

Proell et al.: Ind. Eng. Chem., vol. 40, pages 1129–32 (1948).